(12) United States Patent
Huang

(10) Patent No.: US 7,664,388 B2
(45) Date of Patent: Feb. 16, 2010

(54) DEVICE WITH A LENS-ROTATION MECHANISM

(75) Inventor: Yu-Cheng Huang, Hsinchu (TW)

(73) Assignee: Altek Corporation, Hsinchu (TW)

( * ) Notice: Subject to any disclaimer, the term of this patent is extended or adjusted under 35 U.S.C. 154(b) by 554 days.

(21) Appl. No.: 11/498,242

(22) Filed: Aug. 3, 2006

(65) Prior Publication Data

US 2008/0031614 A1 Feb. 7, 2008

(51) Int. Cl.
*G03B 15/06* (2006.01)

(52) U.S. Cl. ..................... 396/199; 396/429; 396/439

(58) Field of Classification Search ............... 396/199, 396/535, 439, 427–428, 175; 348/373–374, 348/376

See application file for complete search history.

(56) References Cited

U.S. PATENT DOCUMENTS

| 5,289,215 A | * | 2/1994 | Clairmont et al. | ........... 352/243 |
|---|---|---|---|---|
| 5,502,598 A | * | 3/1996 | Kimura et al. | .............. 359/814 |
| 5,794,081 A | * | 8/1998 | Itoh et al. | ...................... 396/55 |
| 5,907,730 A | * | 5/1999 | Tseng et al. | ................. 396/428 |
| 5,930,544 A | * | 7/1999 | Tseng et al. | ................. 396/529 |
| 2004/0101296 A1 | * | 5/2004 | Nakata et al. | .................. 396/65 |

* cited by examiner

*Primary Examiner*—Christopher Mahoney
(74) *Attorney, Agent, or Firm*—Rosenberg, Klein & Lee

(57) ABSTRACT

The present invention discloses a device with a lens-rotation mechanism, which comprises: a casing having a driving device, such as the casing of a camera, a mobile phone or a video camera; and a lens-rotation system installed to the casing and having at least two transmission elements. Those two transmission elements are respectively coupled to the driving device and driven by the driving device to move horizontally and vertically, and those two transmission elements further drive the lens-rotation system to rotate. Thereby, the device with a lens-rotation mechanism proposed by the present invention can control the rotation of a lens.

3 Claims, 5 Drawing Sheets

DEVICE WITH A LENS-ROTATION MECHANISM

BACKGROUND OF THE INVENTION

1. Field of the Invention

The present invention relates to a device with a lens-rotation mechanism, particularly to an image-capture device with a lens-rotation mechanism.

2. Description of the Related Art

The lenses of conventional cameras, mobile phones and video cameras are usually non-rotatable but fixed, or unidirectionally rotatable. Refer to FIG. 1 for a rotation mechanism disclosed in a Taiwan patent No. 234045. As shown in FIG. 1, the camera 2 has a lens-rotation mechanism 4, which enables the lens 6 of the camera 2 to rotate up and down as indicated by the arrow. Thus, the user can snap pictures at different angles within the up-and-down rotation range of the lens-rotation mechanism 4.

When there is no tripod, the user usually places the camera on a convenient support in situ, such as a table or a chair, to take a self-portrait. However, the table or chair usually cannot afford an appropriate angle and altitude to take a self-portrait even though the lens of the camera can rotate unidirectionally. Thus, the user has to accommodate himself to the lens to snap his self-portrait. Therefore, it is hard for the conventional camera to utilize a convenient supporter in situ to take a picture. Further, when the conventional camera is held with a hand to take a short-distance picture, it is hard to aim at the object. When the user intends to take a wide-angle picture with a conventional camera, he manually rotates the camera to obtain a wide angle. However, such a method is likely to have a photographic error.

Accordingly, the present invention proposes a device with a lens-rotation mechanism, whereby the lens can be rotated according to the demand of the user.

SUMMARY OF THE INVENTION

The primary objective of the present invention is to provide a device with a lens-rotation mechanism, wherein a lens, a flashlight, a light-measuring/distance-measuring element and a light-sensing element are arranged inside a rotation mechanism, and the above mentioned elements can be rotated via the rotation mechanism.

Another objective of the present invention is to provide a device with a lens-rotation mechanism, which applies to various image-capture devices, such as a camera, a mobile phone and a video camera, whereby the lens of an image-capture device arbitrarily placed on a convenient supporter can be controlled with a control device to aim at an object and snap it.

Further another objective of the present invention is to provide a device with a lens-rotation mechanism, which applies to various image-capture devices, whereby the lens of an image-capture device can automatically track an object with a software and then snap it.

The device with a lens-rotation mechanism of the present invention comprises: a casing having a driving device, such as the casing of a camera, a mobile phone or a video camera; and a lens-rotation system installed to the casing and having at least two transmission elements. Those two transmission elements are respectively coupled to the driving device of the casing. The driving device can respectively drive those two transmission elements to move in the horizontal and vertical directions, and the transmission elements further drive the lens-rotation system to rotate. The lens-rotation system includes: a first motor and a second motor. Those two transmission elements are respectively a first transmission element and a second transmission element. The first motor is installed to the casing and coupled to the first transmission element. The second motor is installed to the first transmission element and coupled to the second transmission element. The first motor drives the first transmission element to move horizontally/vertically, and the second motor drive the second transmission to move vertically/horizontally, and the lens-rotation system is thus driven to rotate. Besides, a lens, a flashlight, a light-measuring/distance-measuring element and a light-sensing element are also installed in the lens-rotation system.

To enable the objectives, technical contents, characteristics, and accomplishments of the present invention to be easily understood, the embodiments of the present invention are to be described in detail in cooperation with the attached drawings below.

DETAILED DESCRIPTION OF THE INVENTION

The present invention pertains to a device, which can control the lens to rotate in the horizontal direction and the vertical direction. In the present invention, the device refers to any device with an image-capture function. Below, a camera is used to exemplify the present invention.

Figure 1:
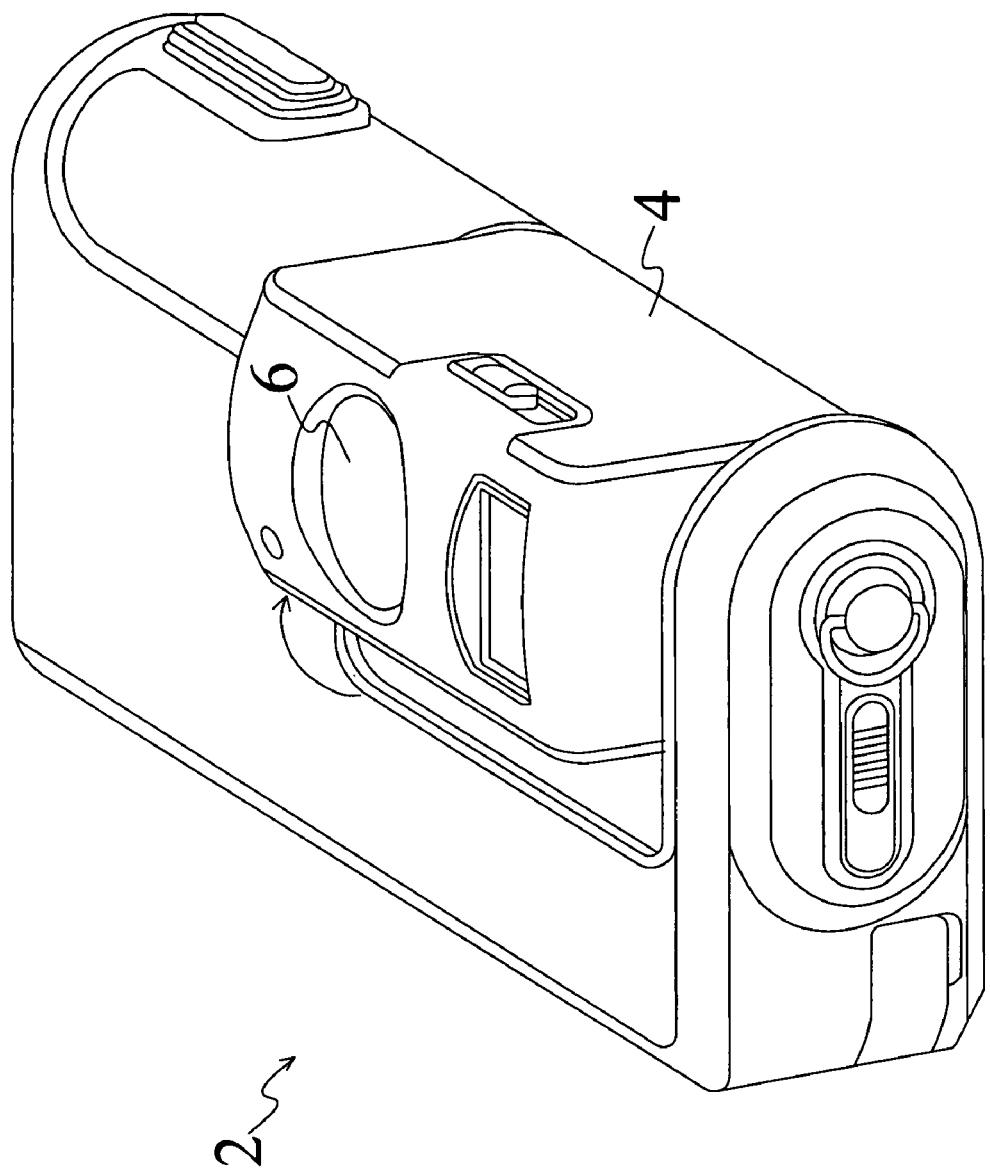
FIG. 1 is a perspective view of a conventional camera.
Figure 2:
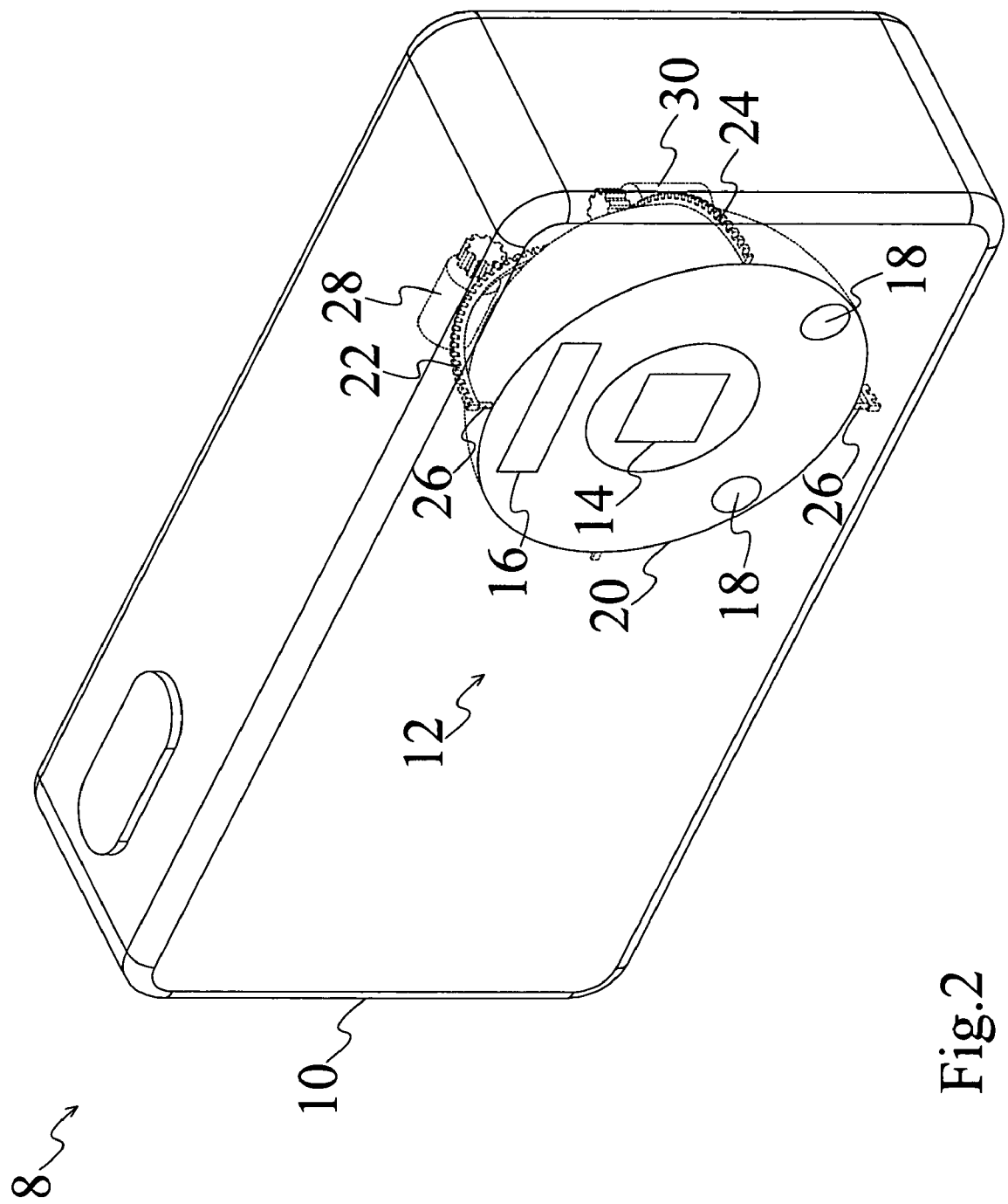
FIG. 2 is a perspective view schematically showing the present invention.
Figure 3:
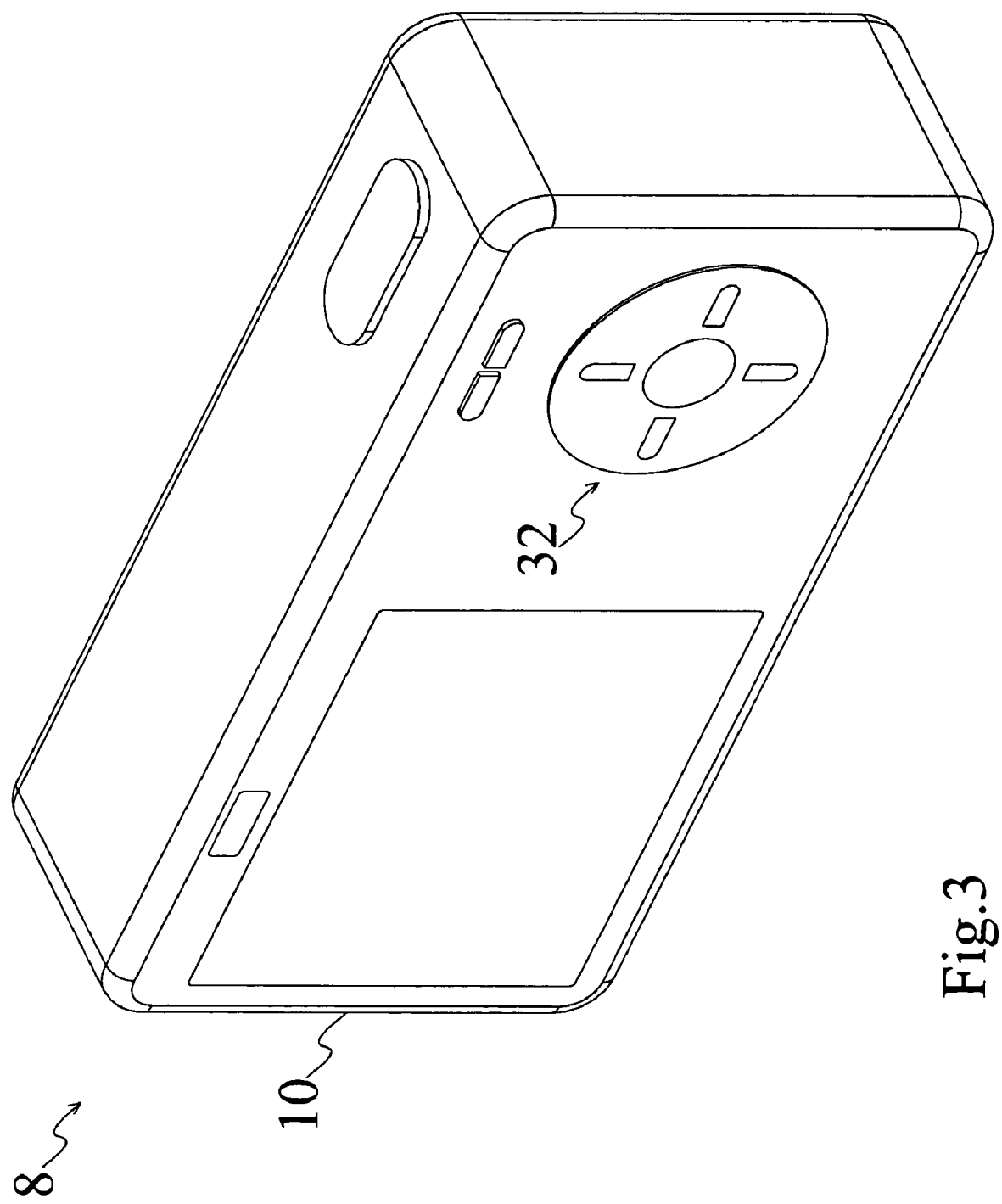
FIG. 3 is a perspective view schematically showing the present invention from another viewpoint.

Refer to FIG. 2 a perspective view schematically showing the present invention. As shown in FIG. 1, the camera 8 comprises: a casing 10 and a lens-rotation system 12 installed to the casing 10. The lens-rotation system 12 includes: an optical module 20 and two transmission elements. The optical module 20 has a lens 14, a flashlight 16, a light-measuring/distance-measuring element 18 and a light-sensing element (not shown in the drawing). Those two transmission elements are respectively a gear rack 22 functioning as a first transmission element and a gear rack 24 functioning as a second transmission element. The gear rack 22 is installed to the optical module 20 with two rotation members 26. The optical module 20 can be rotated in the horizontal direction with those two rotation members 26 being pivot points. The casing 10 also has a first motor 28 and a second motor 30, which function as driving devices. The first motor 28 is installed to the casing 10 and coupled to the gear rack 22 of the lens-rotation system 12; the second motor 30 is installed to the gear rack 22 of the lens-rotation system 12 and coupled to the gear rack 24. Refer to FIG. 3, the casing 10 also has a control device composed of a control unit (not shown in the drawing) and control keys 32, and the control device is respectively connected to the first motor 28 and the second motor 30. The user can control the first motor 28 and the second motor 30 to respectively drive the gear rack 22 and the gear rack 24 to move.

Figure 4:
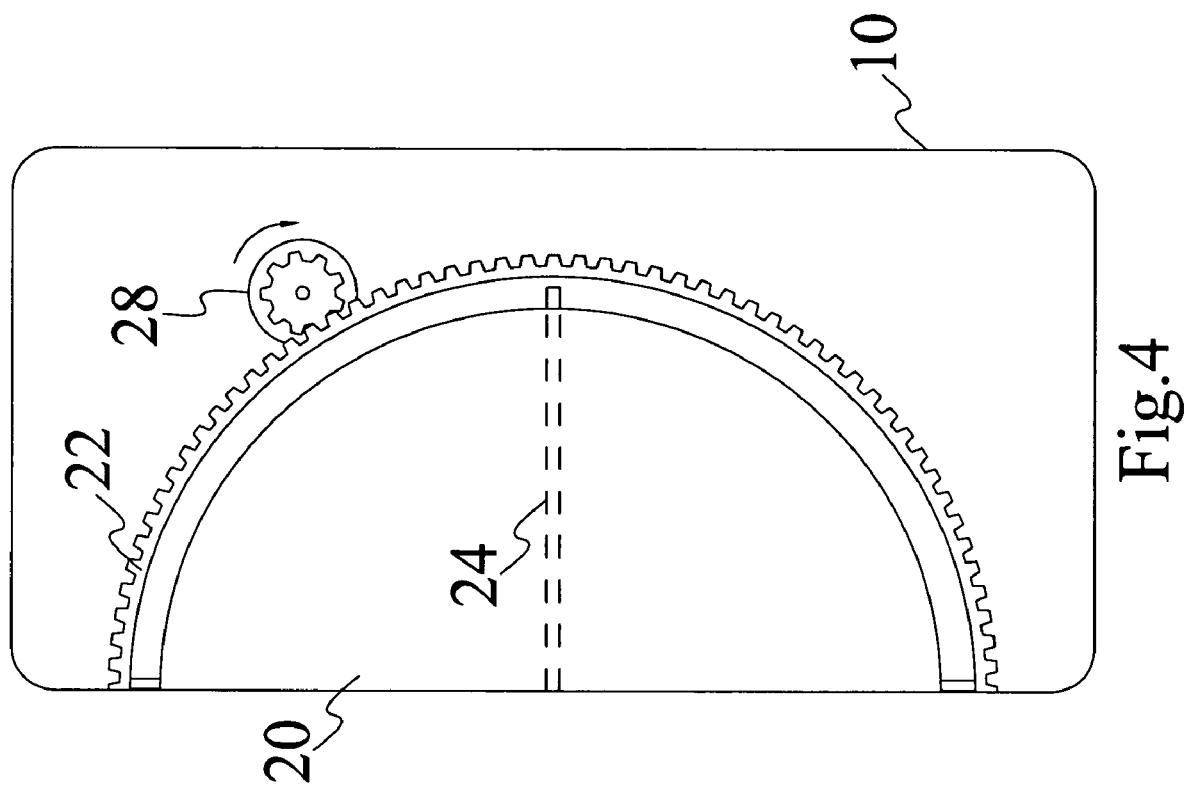
FIG. 4 is a side view schematically showing the present invention.
Figure 5:
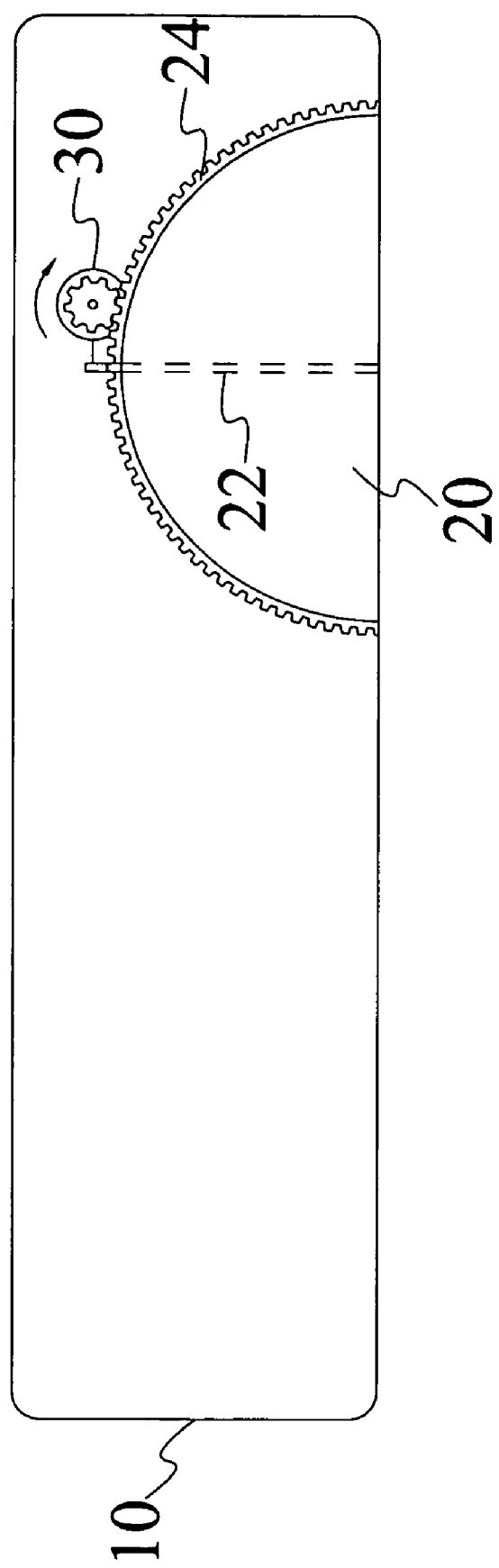
FIG. 5 is a top view schematically showing the present invention.

Refer to FIG. 4 and FIG. 5 respectively a side view and a top view schematically showing the present invention. The user can operate the control keys 32 to respectively control the first motor 28 and the second motor 30 to move. As shown in FIG. 4, the first motor 28 can drive the gear rack 22 to move in the vertical direction as indicated by the arrow; thus, the optical module 20, the gear rack 24 and the second motor 30 are also driven to move in the vertical direction; then, the lens 14, the flashlight 16, the light-measuring/distance-measuring element 18 and the light-sensing element are rotated synchronically in the vertical direction. Further, as shown in FIG. 5, the second motor 30 can drive the gear rack 24 to move in the horizontal direction; thus, the optical module 20 is also driven to move in the horizontal direction with those two rotation members 26 being pivot points; then, the lens 14, the flashlight 16, the light-measuring/distance-measuring element 18 and the light-sensing element are rotated synchronically in the horizontal direction. Thereby, the lens-rotation system 12 of the camera 8 can be rotated via the vertical movement of the gear rack 22 driven by the first motor 28 and the horizontal movement of the gear rack 24 driven by the second motor 30.

When the user intends to snap a self-portrait, he can install the camera 8 to a tripod or place the camera 8 on a convenient support to enable the lens 14 to face the shot sight; then, he manually operates the control keys 32 to control the first motor 28 to drive the gear rack 22 to move in the vertical direction and the second motor 30 to drive the gear rack 24 to move in the horizontal direction; thereby, the user can rotate the lens 14 to aim at the object; and a self-portrait snapping is thus completed. Via the present invention, the user not only can use a tripod as the support to snap pictures but also can use a simple and convenient supporter in situ as the support to snap pictures, such as a table or a chair. Further, the user can also use the control keys 32 to program a software to enable the lens to automatically track the object; for example, when the user intends to snap a portrait, he can enable the lens 14 to automatically track the face of the object and precisely capture the expression of the object. Thus, via the present invention, the camera 8 can be free from the conventional problem that a camera is hard to aim at the object. Besides, in cooperation with an image-synthesis software built in the camera 8, the user can operate the control keys 32 to control the lens 14 to rotate and snap a wide-angle picture without any photographic error.

Those preferred embodiments described above are to clarify the present invention to enable the persons skilled in the art to understand, make and use the present invention. However, it is not intended to limit the scope of the present invention. Any modification and variation according to the structures, shapes, characteristic and spirit disclosed in the present invention is to be included within the scope of the claims of the present invention.

What is claimed is:

1. A device with a lens-rotation mechanism, comprising:
   a casing;
   a lens-rotation system mounted in said casing and including an optical module and at least two transmission elements coupled to said optical module, said optical module including a lens and a flashlight, each of said two transmission elements being an arcuate gear rack, a first of said arcuate gear racks being pivotally coupled to said optical module by a pair of rotation members, a second of said arcuate gear racks being coupled to said optical module orthogonally with respect to said first arcuate gear rack; and
   a driving device including a first motor and a second motor, said second motor being operatively coupled to said second arcuate gear rack for driving said second arcuate gear rack to rotate said optical module about an axis defined by said pair of rotation members, said first motor being operatively coupled to said first arcuate gear rack for driving said first arcuate gear rack to rotate said optical module and said second motor about an axis orthogonal to said axis defined by said pair of rotation members.

2. The device with a lens-rotation mechanism according to claim 1, wherein said casing is a casing of an image-capture device.

3. The device with a lens-rotation mechanism according to claim 2, wherein said image-capture device is a camera, a mobile phone, or a video camera.

* * * * *